No. 722,432. PATENTED MAR. 10, 1903.
A. PROUVOST.
SPRING SPOKE FOR WHEELS.
APPLICATION FILED MAY 20, 1902.
NO MODEL.
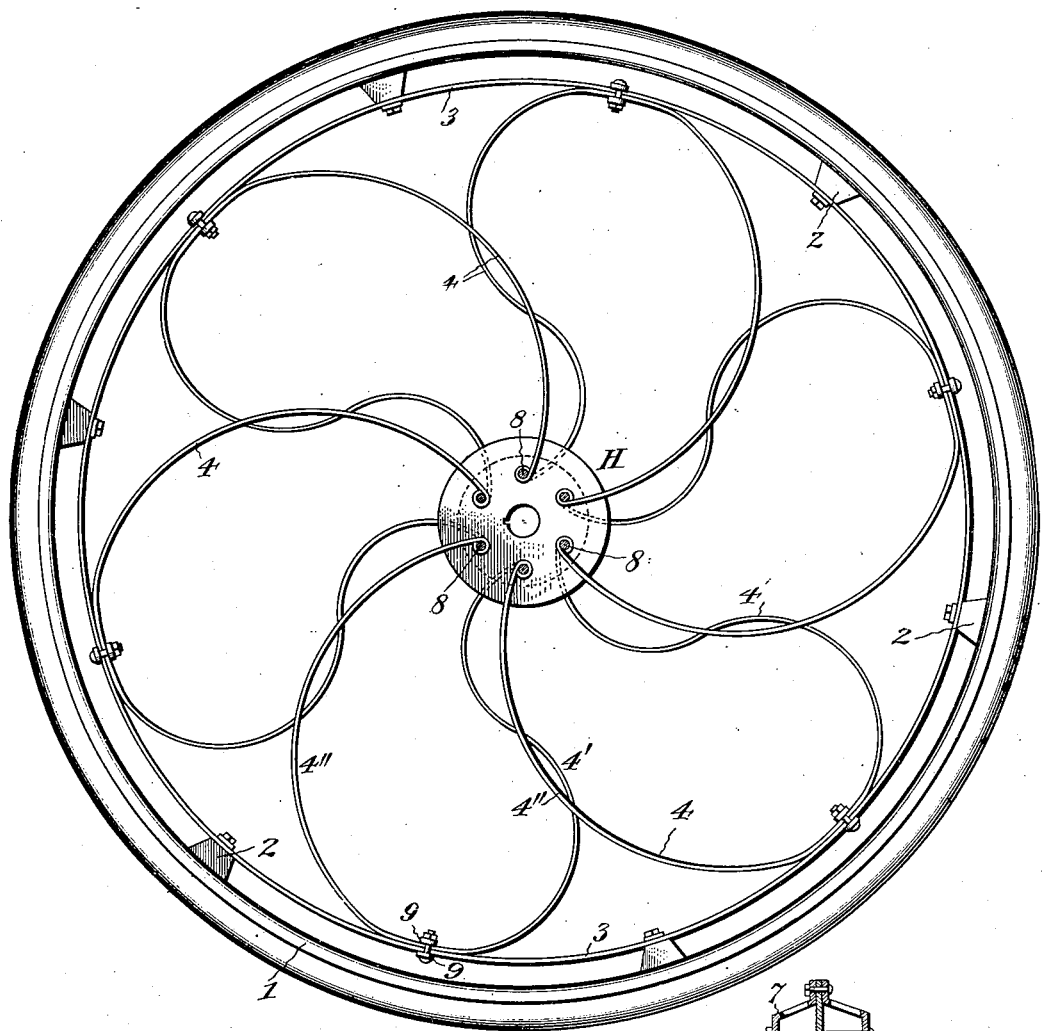
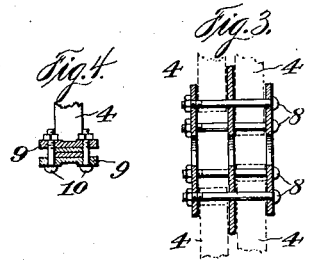
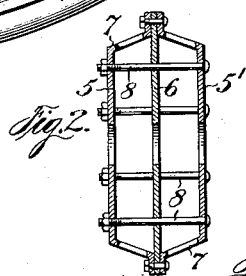

UNITED STATES PATENT OFFICE.

ALPHONSE PROUVOST, OF TOURCOING, FRANCE.

SPRING-SPOKE FOR WHEELS.

SPECIFICATION forming part of Letters Patent No. 722,432, dated March 10, 1903.

Application filed May 20, 1902. Serial No. 108,221. (No model.)

*To all whom it may concern:*

Be it known that I, ALPHONSE PROUVOST, a citizen of the Republic of France, residing at Tourcoing, France, have invented certain new and useful Improvements in Spring-Spokes for Wheels; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has relation to vehicle-wheels, and more particularly to that type having elastic or resilient spokes; and it consists in the form of the spokes and in the means for connecting them to the wheel hub and rim, as will now be fully described, reference being had to the accompanying drawings, in which—

Figure 1 is an elevation of a vehicle-wheel embodying my invention. Figs. 2 and 3 are vertical sections of the wheel-hub, the converging flanges of the outer disks being omitted in Fig. 3 and some of the spokes shown in dotted lines; and Fig. 4 is a section showing the connection of the spokes with an independent or separate spoke-rim.

In Fig. 1 I have shown a wheel provided with a rubber tire, which may be a pneumatic or solid tire, or a metal tire may be used. The wheel-rim 1 may be made of any suitable material and form to receive any desired tire, and to said rim are bolted at suitable distances apart blocks 2, to which is bolted a spoke rim or ring 3. The spokes 4 are made of flat spring metal and are substantially pear-shaped—that is to say, they have a back or tension side 4" in the form of an arc and a belly or compression side 4' in the form of a compound curve—and have their points of attachment to the spoke-ring 3 in planes radiating from the axis of rotation or center of the hub H, while the opposite ends of said spokes are pivotally connected to said hub in different radial planes. The reversely-convexed portions—*i. e.*, the tension and compression sides or members 4" 4'—of each spoke are eccentric to the radii of their points of attachment, whereby I not only obtain the greatest possible elasticity, but also the necessary resistance to the load and to shocks, and by the manner of connecting the spokes I am enabled to use but one-half as many bolts as there are spoke-terminals. On the other hand, by the form of the spokes and their pivotal connection with the hub the detrimental torsional strains on the spokes due to forward and downward movement of the hub under the pull and load are avoided.

The hub H is composed of three disks—namely, two outer disks 5 5' and an intermediate disk 6 of greater diameter than said outer disks—said hub being of suitable construction to form a proper bearing for the wheel-axle, (not shown,) and in the drawings I have shown the disks of the hub merely provided with an axial aperture for said wheel-axle. The outer disks 5 and 5' have converging flanges 7, bolted to the center disk, said flanges having slots for the passage of the spokes.

As clearly shown in Figs. 1 and 3, the terminals of the resilient spokes 4 are connected to bolts 8, the wheel shown in Fig. 1 having six spokes. The connection of their twelve terminals to the hub is such as to require but six bolts, in that one terminal of a spoke is secured to a bolt 8 on one side of the central hub-disk 6 and its other terminal to the next succeeding spoke on the opposite side of said central hub-disk, which arrangement also prevents the interference of the spokes with one another in their movements of compression and elongation, both vertically under the load and horizontally under the pull of draft or under shocks in radial directions, the portion of greater radius—namely, the back 4"—of the spokes being curved in the direction of rotation of the wheel, while the portion of smaller radius—namely, the belly 4'—of the spoke curves in a reverse direction.

In wheels having spring or elastic spokes it is of great importance that the strength of the spokes should not be impaired—as, for instance, by bolt-holes—and to avoid this the terminals of said spokes are bent around the bolts 8 and are secured to the spoke-ring 3 by means of clamping-plates 9 9 and bolts and nuts 10 10, passing through said plates on opposite edges of the spokes 4, as more clearly shown in Fig. 4.

The spoke-ring 3 not only serves as a convenient means for connecting the spokes to the wheel-rim, but also adds somewhat to the elasticity of the spoke system, as will be readily understood.

Having thus described my invention, what I claim as new therein, and desire to secure by Letters Patent, is—

1. In a vehicle-wheel, the combination with the wheel rim and hub, of flat spring-metal spokes having a tension side in the form of an arc and a compression side in the form of a compound curve, for the purpose set forth.

2. In a vehicle-wheel, the combination with the wheel rim and hub, of flat spring-metal spokes having a tension side in the form of an arc and a compression side in the form of a compound curve connected to said wheel rim and hub so as not to interfere with one another during elongation and compression, for the purpose set forth.

3. In a vehicle-wheel, the combination with the wheel rim and hub, of flat spring-metal spokes having a tension side in the form of an arc, and a compression side in the form of a compound curve, said spokes having their terminals connected to the hub in different planes, for the purpose set forth.

4. In a vehicle-wheel, the combination with the wheel rim and hub, of flat spring-metal spokes having a tension side in the form of an arc and a compression side in the form of a compound curve, said spokes having their terminals pivoted to the hub in different planes, for the purpose set forth.

5. In a vehicle-wheel, the combination with the wheel rim and hub, of flat spring-metal spokes having a tension side in the form of an arc and a compression side in the form of a compound curve, said spokes connected to the rim and hub with the tension side facing the direction of forward rotation of the wheel, substantially as set forth.

6. In a vehicle-wheel, the combination with the wheel rim and a hub composed essentially of three disks and bolts arranged in a circle and connecting said disks; of substantially pear-shaped, flat, spring-metal spokes having their ends connected to different bolts on opposite sides of the center disk of said hub, for the purpose set forth.

7. In a vehicle-wheel, the combination with the wheel rim and hub, and a spoke rim or ring concentric with and secured to said wheel-rim, of elastic spokes connected to the spoke ring and hub, for the purpose set forth.

8. In a vehicle-wheel, the combination with the wheel rim and hub and a spoke rim or ring concentric with and secured to said wheel-rim, of substantially pear-shaped spokes of flat spring metal, having their terminals connected to the hub and their bight clamped to the spoke-ring, substantially as set forth.

In testimony that I claim the foregoing as my invention I have signed my name in presence of two subscribing witnesses.

A. PROUVOST.

Witnesses:
ALFRED SCHMIEGER,
JULES ROUSSE.